United States Patent [19]

Thiele

[11] Patent Number: 5,536,810
[45] Date of Patent: Jul. 16, 1996

[54] PROCESS FOR THERMAL TREATMENT OF POLYESTER CHIPS IN THE SOLID STATE

[75] Inventor: Ulrich Thiele, Bruchkoebel, Germany

[73] Assignee: Zimmer Aktiengesellschaft, Germany

[21] Appl. No.: 520,849

[22] Filed: Aug. 30, 1995

[30] Foreign Application Priority Data

Feb. 1, 1995 [DE] Germany .................. 195 03 054.0

[51] Int. Cl.$^6$ ...................................... C08F 6/00
[52] U.S. Cl. ................. 528/481; 528/298; 528/300; 528/301; 528/302; 528/307; 528/308; 528/308.2; 528/308.6; 528/483; 528/452; 528/502; 528/503
[58] Field of Search ............... 528/298, 300, 528/301, 302, 307, 308, 308.2, 308.6, 481, 483, 492, 502, 503

[56] References Cited

U.S. PATENT DOCUMENTS

| | | |
|---|---|---|
| 3,405,098 | 10/1968 | Heighton et al. .................. 528/308.5 |
| 3,728,309 | 4/1973 | Maxion ............................... 528/481 |
| 4,064,112 | 12/1977 | Rothe et al. ........................ 528/272 |
| 4,161,578 | 7/1979 | Herron ................................ 528/272 |
| 4,223,128 | 9/1980 | Halek et al. ........................ 528/481 |
| 4,238,593 | 12/1980 | Duh .................................... 528/272 |
| 4,532,319 | 7/1985 | Wendling ........................... 528/274 |
| 5,292,865 | 3/1994 | Kerpes et al. ..................... 528/492 |

Primary Examiner—Samuel A. Acquah
Attorney, Agent, or Firm—Banner & Allegretti, Ltd.

[57] ABSTRACT

Process for thermal solid-state treatment of chips of saturated polyester, where the chips are crystallized immediately before the thermal treatment and the thermal treatment is carried out in a static bed at a chip temperature that is equal to TE (1 μm) ±2° C., where TE (1 μm) is the temperature at which a measurement probe placed on a crystallized chip is lowered by 1 μm under defined conditions in a thermomechanical analysis. The crystallization preferably takes place in a fluidized bed at three different specified temperatures.

8 Claims, No Drawings

5,536,810

1

PROCESS FOR THERMAL TREATMENT OF POLYESTER CHIPS IN THE SOLID STATE

This invention concerns an optimized process for thermal treatment of freshly crystallized chips made of linear polyester under continuous gravity flow, i.e. in a static bed, which process permits thermal treatment to be carried out at economically high temperatures without agglomeration of the chips.

THE PRIOR ART

Processes for thermal treatment of polyester chips in the solid state such as solid-state polycondensation, dealdehydization and/or drying are described in numerous patents, where treatment temperatures in the range of 180° C. to 245° C. are specified for polyethylene terephthalate (such as U.S. Pat. Nos. 3,405,098, 4,064,112, 4,161,578, 4,223,128, 4,238,593 and European patent 222,714). This thermal treatment is preceded by crystallization which may be performed at a temperature lower than that of the thermal treatment (according to U.S. Pat. Nos. 3,405,098, 4,161,578 and 4,223,128), at the same temperature (European patent 222,714) or at a higher temperature (U.S. Pat. No. 4,064,112). A gradual increase in temperature has also been used (European patent 379,684). Crystallization takes place in a fluidized bed by means of mechanical devices (U.S. Pat. Nos. 4,161,578 and 4,223,128) or by means of fluidization using gases (European patents 9,875 and 379,684). Crystallization can also be induced by stretching the freshly extruded polyester strands before granulation (U.S. Pat. No. 5,292,865).

The purpose of crystallization prior to the thermal treatment is to prevent sticking of the granules or chips under the conditions of the thermal treatment, especially at higher temperatures. In practice, however, there is the problem of sticking and solid agglomeration of the polyester granules during the thermal treatment, where copolyesters with a delayed crystallization rate are especially difficult to control. Problems also occur repeatedly due to agglomeration when a plant changes product from unmodified polyester to modified polyester, which may be necessary in producing polyethylene terephthalates for beverage bottles.

Therefore, it is proposed in some patents that the thermal treatment not be carried out at a specified absolute temperature, but instead at a temperature to be specified as a function of a thermal polyester property, such as a temperature that is 5° to 40° C. or 5° to 50° C. below the melting point of the polyester (British patents 2,045,786 and 1,361,080, East German patent 139,129). This is evidently the crystallite melting point of the polyester, which does not permit any exact deduction regarding the temperature at which the granules or chips begin to stick, which is below the crystallite melting point to an extent that depends on the composition of the polyester. These patents do not contain any teaching regarding the temperature at which the thermal treatment can be carried out without any risk of sticking within the stated wide temperature range of 35° C. or 45° C.

The teachings disclosed by European patents 31,469 and 32,163 that recommend a temperature of 5° to 25° C. below the maximum melting point determined by differential thermal calorimetry are slightly more concrete. However, this maximum melting point which is based on measurement of the amount of heat does not ally any direct inference as to the temperature at which sticking begins under the conditions of a fixed-bed reactor in which the individual chips are exposed not only to heat but also to the weight of the chips above them.

U.S. Pat. No. 4,532,319 discloses solid-state polycondensation of polyesters at a temperature 1° to 50° C. below the sticking temperature, but it does not specify how this sticking temperature is to be determined. For crystalline polyethylene terephthalate, this sticking temperature should be about 230° C. according to column 2, lines 32–34 and slightly above 240°–245° C. according to column 3, lines 3–7. In view of such contradictory statements, this patent specification does not disclose any concrete teaching for determining sticking temperature.

U.S. Pat. No. 3,728,309 proposes that the solid-state polycondensation of polyester be performed at a temperature 2° to 12° C. below the temperature (which also changes as the treatment progresses) at which a sample of polyester pressed lightly with the hand will leave a melt trace on a heated metal surface. Although this temperature is referred to as the sticking temperature, it is still a subjective, general softening point. There is no direct reference to the temperature at which sticking occurs in a reactor with a static bed. In addition, the control costs are high for a process with a progressive temperature.

OBJECT OF THE INVENTION

Therefore, the object of this invention is to define a narrowly limited solid-phase treatment temperature that can be determined easily and reproducibly for any polyester composition and is low enough on the one hand to prevent sticking and agglomeration of the polyester chips during the thermal treatment in a static bed while on the other hand being high enough to assure an economically feasible maximum treatment time. In addition, the invention includes preferred conditions for crystallization of polyester chips prior to the thermal treatment that permit maximizing the temperature of the thermal treatment.

SUMMARY OF THE INVENTION

This object is achieved according to this invention by a thermal treatment process of polyester chips at a chip temperature of TE (1 µm) ±2° C., which process includes a procedure for determining TE (1 µm), where TE (1 µm) is the average temperature at which a measurement probe having a hemispherical head with a diameter of 3 mm that is placed on a crystallized chip and is loaded with 0.5N (Newton) will drop or descend by 1 µm (micron) as determined by thermomechanical analysis (TMA) at a heating rate of 5° C./min. The thermal treatment may consist of solid-state condensation, dealdehydization and/or drying in the presence of an inert gas such as dry air, nitrogen, noble gases, carbon dioxide or mixtures of at least two of these gases.

The usual polyester chips have an individual chip weight of about 10 to 20 mg, which corresponds to a chip diameter of about 2.5–3.0 mm. Assuming spherical chips, and a bed depth of about 8 m, a load of about 0.5N at the chip contact points is approximated. The TMA determination defined above thus simulates rather accurately the conditions prevailing in a static bed reactor for thermal treatment of polyester chips on an industrial scale, especially the load of the individual chips with a bed depth of up to about 8 m. A bed depth of more than 8 m does not lead to any additional problems, because the progressive thermal treatment is associated with a decline in the tendency of the chips to stick and experience has shown that severe sticking is observed only in the top third of the static bed. This top third does not exceed a depth of 8 m in any case.

The determination of TE (1 μm) is described below with reference to FIG. 1 of the drawing, which shows the TMA curve of a slowly crystallizing polyester (measurement apparatus used: commercially available Mettler thermomechanical analyzer) which finally enters the melt stage. The starting position of the measurement probe that has a hemispherical head with a diameter of 3 mm and is placed on a chip sample is 0 μm (ordinate) at the start of the measurement. With an increase in temperature (heating rate 5° C./min), the polyester chip sample undergoes a thermal expansion that is mostly compensated by shrinkage processes in the range of the glass transition temperature. After passing the glass transition temperature, the measurement probe is deflected toward positive ordinate values in proportion to the increase in temperature as a result of the thermal expansion of the sample (the range is from about 125° C. to 190° C. here). With a further increase in temperature, the polyester sample begins to soften until it finally enters the melt phase. This leads first to a gradual deviation from the linear curve in the direction of decreasing ordinate values and finally there is a steep drop in the curve when the sample melts. The lowering of the measurement probe in the range of gradual softening of the sample is caused by the penetration of the head of the probe into the polyester sample and by flattening of the sample under the given load of 0.5 N. TE (1 μm) is the temperature at which the lowering of the measurement probe, based on the linear curve, amounts to 1 μm. To determine this temperature, a tangent is drawn to the linear range of the curve and the temperature at which the tangent and the curve differ by 1 μm is determined. In the case shown in FIG. 1, this temperature is 202° C.

It has surprisingly been found that the temperature interval between TE (1 μm) and the temperature of the inversion point of the curve ($T_u$), which corresponds approximately to the Vicat softening point, is different for different polyesters. The interval between TE (1 μm) and the crystallite melting point is also different for different polyesters. In numerous experiments it has been demonstrated that TE (1 μm) ±2° C. is the maximum temperature at which a thermal treatment is possible in a static bed of chips of saturated polyester of any composition without risk of sticking or agglomeration. In the state of the art processes based on the softening point or the crystallite melting point, the higher temperatures of the range given, which are of economic interest, can generally be used only with polyethylene terephthalate without any risk of downtime of the installation because of sticking of the chips, but the teaching according to this invention makes it possible to determine the maximum possible treatment temperature, which is therefore also the most economical, in a simple and reproducible manner for any partially crystalline polyester, regardless of the composition. In this regard, it should be pointed out that a 5° C. higher treatment temperature leads to a 1.2 to 1.5 times shorter dwell time. Specifically, this invention also permits thermal treatment of sticky polyesters at maximum temperatures with no problem and also permits a rapid and controlled change in the treatment temperature when changing the type of polyester.

TE (1 μm) depends on the chemical composition of the polyester and its degree of crystallinity. In order to rule out the possibility of fluctuations due to different degrees of crystallinity of individual chips, TE (1 μm) is given as the average of the measurements on at least 5 individual chips. Depending on the production conditions, TE (1 μm) can be determined in a preliminary trial on chips of the same composition, after simulating the crystallization that is induced prior to the thermal treatment.

Immediately before the thermal treatment in the static bed, the polyester chips to be treated are subjected to crystallization by known methods. Crystallization can be accomplished by any method—for example, in a fluidized bed at a temperature equal to or higher than the temperature of the thermal treatment according to the method of U.S. Pat. No. 4,064,112, or by drawing the freshly extruded polyester strands before pelletization according to the specifications of U.S. Pat. No. 5,292,865.

Crystallization is preferably performed continuously with maximization of TE (1 μm) while at the same time maintaining an economically feasible maximum dwell time. Such a maximization of TE (1 μm) is achieved by continuous crystallization of the polyester chips in a fluidized bed in a first step in the presence of chips that have already been crystallized, at a chip temperature in the range of 140° to 200° C. or up to 220° C. and an average residence time of the chips in the range of 15 to 150 min, in a second step at a higher temperature which is in the range of 170° C., preferably 200° C. to 5° C. below the crystallite melting point of the polyester and 1° C. to 40° C., preferably 3° C. to 20° C. above the temperature of the thermal treatment, and an average dwell time in the range of 30 to 200 minutes and in a third step at a temperature that drops slowly from the temperature of the second step to the temperature of the thermal treatment and with an average dwell time in the range of 1 to 50 minutes. Crystallization takes place in a fluidized bed, which is achieved by introducing a strong stream of inert gas such as dry air, nitrogen, noble gases, carbon dioxide, or mixtures of at least two of these gases, and/or by means of mechanical devices. The presence of precrystallized chips in the first step together with the forced movement of the chips prevents sticking of the granules in this especially critical step. In a continuous process, the presence of crystalline chips is accomplished automatically, where the amount of such chips should be at least ⅓ of the total amount, depending on the intensity of the forced movement of the chips and the dimensions of the equipment.

The difference between the temperature of the second crystallization step and that of the thermal treatment should be greater, the higher the temperature of the thermal treatment. A longer dwell time in the third crystallization step makes a significant contribution to making the degree of crystallization of the individual chips more uniform.

The temperature of the chips—during the three crystallization steps and also during the subsequent thermal treatment—is adjusted by thermal conduction from the reactor walls and/or by introducing an inert gas such as dry air, nitrogen, noble gases, carbon dioxide or mixtures of at least two of these gases heated to an appropriate temperature. Depending on the quantity ratio of chips to gas, the gas temperature should be about 5° C. to 15° C. higher than the chip temperature to be established, and for the third crystallization step the gas temperature should be 10° C. to 20° C. lower than the chip temperature. The inert gas for the thermal treatment should have a dew point below −15° C., and preferably below −40° C. for the solid state condensation and the dealdehydization. The size of the chips is not essential to this process, but it should be in the usual range of about 5 to 25 mg, preferably 10 to 20 mg per chip.

The process according to this invention can be used for thermoplastic, partially crystalline linear polyesters, where the preferred polyesters are those derived from at least one of the dicarboxylic acids such as terephthalic acid, isophthalic acid, 2,6-naphthalenedicarboxylic acid, 4,4'-biphenyldicarboxylic acid and 1,4-cyclohexanedicarboxylic acid as well as at least one of the diols ethylene glycol, 1,3-propanediol, 1,4-butanediol, 1,4-cyclohexanedimethanol and diethylene glycol. Especially preferred are ethylene terephthalate copolymers with a total of 0.8 to 10 wt % (based on the copolymer) diethylene glycol units, and/or 1,4-cyclohexanedimethanol units and/or isophthalic acid units. The intrinsic viscosity (measured at 25° C. on a solution of 125 mg polyester in 25 ml of a mixture of phenol and 1,2-dichlorobenzene in a weight ratio of 3:2) of the polyester before the thermal treatment should be at least 0.30 dl/g, preferably at least 0.50 dl/g.

SPECIFIC EXAMPLES

Examples 1 and 2

Polyester chips were crystallized in one step at different temperatures and dwell times while passing a stream of nitrogen through the pellets to fluidize them (dew point below −20° C.) and then TE (1 μm) and $T_u$ were determined by thermomechanical analysis with a Mettler TMA 40 analyzer according to the specifications given above. The crystallization parameters and the measurement results are summarized in Table 1 for unmodified polyethylene terephthalate with a natural diethylene glycol content of 1.18 wt %, an intrinsic viscosity of 0.63 dl/g and a crystallite melting point (determined by DSC) of 254.5° C. Table 2 contains the same data for a modified polyethylene terephthalate with 1.81 wt % diethylene glycol, 1.8 wt % 1,4-cyclohexane dimethanol and 0.9 wt % isophthalic acid and with an intrinsic viscosity of 0.64 dl/g and a crystallite melting point (DSC) of 241° C.

TABLE 1

| Crystallization | | TMA measurement | |
| --- | --- | --- | --- |
| Dwell Time (hrs) | Temperature (°C.) | TE (1 μm) (°C.) | $T_u$ (°C.) |
| 1.0 | 170 | 157 | 167 |
| 2.0 | 170 | 167 | 175 |
| 4.0 | 170 | 168 | 173 |
| 0.5 | 230 | 212 | 220 |
| 1.0 | 230 | 221 | 229 |
| 2.0 | 230 | 225 | 231 |
| 4.0 | 230 | 226 | 236 |
| 1.0 | 240 | 224 | 236 |
| 2.0 | 240 | 228 | 240 |
| 4.0 | 240 | 230 | 242 |

TABLE 2

| Crystallization | | TMA measurement | |
| --- | --- | --- | --- |
| Dwell Time (hrs) | Temperature (°C.) | TE (1 μm) (°C.) | $T_u$ (°C.) |
| 0.5 | 170 | 158 | 162 |
| 1.0 | 170 | 163 | 168 |
| 2.0 | 170 | 163 | 167 |
| 4.0 | 170 | 164 | 168 |
| 0.5 | 230 | 202 | 222 |
| 1.0 | 230 | 210 | 220 |
| 2.0 | 230 | 214 | 224 |
| 4.0 | 230 | 214 | 224 |
| 1.0 | 240 | 214 | 226 |
| 2.0 | 240 | 216 | 228 |
| 4.0 | 240 | 216 | 228 |

Examples 3 and 4

Uncrystallized chips of the modified and unmodified polyethylene terephthalate from Examples 1 and 2 were first precrystallized at 170°–190° C. with an average dwell time of 20–30 minutes in a fluidized bed crystallizer in the presence of a strong stream of nitrogen, then crystallized at a temperature $T_2$ with a dwell time of 1.0 hour in a mechanically agitated crystallizer through which nitrogen was passed, then cooled to TE (1 μm) within 10–15 minutes, and finally subjected to Polycondensation in the solid state at the temperature $T_4$ for a period of 8–12 hours while introducing nitrogen with a dew point of −70° C. A trial was conducted by the teaching according to this invention with $T_4$= TE (1 μm) ±2° C. and a comparative trial was conducted with $T_4$> TE (1 μm) ±2° C. The process parameters and the results for the unmodified polyester are summarized in Table 3 and the findings with the modified polyester are summarized in Table 4.

TABLE 3

| $T_2$ (°C.) | TE (1 μm) (°C.) | $T_u$ (°C.) | $T_4$ (°C.) | | Sticking |
| --- | --- | --- | --- | --- | --- |
| | | | Invention | Comparison | |
| 212 | 205 | 211 | 207 | | none |
| 212 | 205 | 211 | | 211 | slight |
| 225 | 215 | 223 | 215 | | none |
| 225 | 215 | 223 | | 220 | severe |
| 230 | 218 | 228 | 217 | | none |
| 230 | 217 | 228 | | 223 | slight |
| 240 | 220 | 238 | 220 | | none |
| 240 | 220 | 238 | | 225 | slight |

The same results were obtained when the temperature of the first step precrystallizer was 190°–220° C.

TABLE 4

| $T_2$ (°C.) | TE (1 μm) (°C.) | $T_u$ (°C.) | $T_4$ (°C.) | | Sticking |
| --- | --- | --- | --- | --- | --- |
| | | | Invention | Comparison | |
| 210 | 204 | 211 | 205 | | none |
| 210 | 204 | 211 | | 211 | slight |
| 230 | 210 | 220 | 211 | | none |
| 230 | 209 | 220 | | 212 | slight |
| 240 | 216 | 226 | 215 | | none |
| 240 | 220 | 238 | | 229 | severe |

The same results were obtained when the temperature of the first step precrystallizer was 190°–205° C.

Example 5 (comparative):

Polyethylene terephthalate chips with 1.2 wt % diethylene glycol and an intrinsic viscosity of 0.63 dl/g were precrystallized continuously at a throughput of 20 kg/hr and an average dwell time of 30 minutes in a fluidized bed crystallizer in the presence of a strong stream of nitrogen at a gas temperature of 180° C. and then crystallized in a stirred crystallizer through which nitrogen was passed while heating the chips to 223° C. at a dwell time of 40 minutes. The chips were then sent directly to a solid-state polycondensation reactor and subjected to polycondensation in the presence of nitrogen (dew point −70° C.) at an average temperature of 220° C. After an operating time of 4 hours, the level of the chips began to fluctuate in the solid-state polycondensation reactor, and after 4 more hours the feed had to be interrupted because a massive bridge of pellets had formed at the head of the reactor. Measurement of TE (1 μm)

after the second crystallization step yielded a temperature of 210° C.

Example 6

Precrystallization of the unmodified polyethylene terephthalate chips from Example 3 was performed as described there. In the crystallization, the final temperature of the chips was set at 232° C., next they were cooled to 221° C. during a dwell time of 7 minutes and then the solid-state polycondensation was performed at an average temperature of 220° C. There were no fluctuations in level or problems in discharge from the reactor.

The temperature measured as TE (1 μm) after the second crystallization step was 220° C. and $T_u$ was 231° C.

Example 7

Co-polyethylene terephthalate chips containing 1.1 wt % diethylene glycol and 2.0 wt % isophthalic acid with an intrinsic viscosity of 0.63 dl/g and a crystallite melting point (DSC) of 250° C. were precrystallized continuously with a throughput of 30 kg/hr, and an average dwell time of 20 minutes in a fluidized bed crystallizer in the presence of nitrogen at a gas temperature of 185° C., and then crystallized in the presence of nitrogen in a stirred crystallizer while heating to 230° C. for a dwell time of 50 minutes. Next the chips were cooled to 211° C. for 10 minutes and then solid-state polycondensation was performed in the presence of nitrogen at an average chip temperature of 212° C. There were no fluctuations in level of the chips or problems in discharge from the solid-state polycondensation reactor.

Measurement of TE (1 μm) yielded a temperature of 213° C. and $T_u$ was 225° C.

Example 8

The co-polyethylene terephthalate chips from Example 7 were precrystallized continuously at a throughput of 30 kg/hr and an average dwell time of 20 minutes in a fluidized bed crystallizer in the presence of nitrogen at a gas temperature of 190° C., then crystallized in the presence of nitrogen in a stirred crystallizer while heating to 240° C. with a dwell time of 50 minutes and next cooled to 220° C. for a period of 10 minutes. Then the solid-state polycondensation was performed in the presence of nitrogen at an average chip temperature of 220° C. There were no fluctuations in level of the chips or problems in discharge from the solid-state polycondensation reactor. The measurement of TE (1 μm) yielded a temperature of 219° C. and $T_u$ was 238° C.

Example 9

The co-polyethylene terephthalate chips from Example 7 were precrystallized continuously at a throughput of 18 kg/hr and an average dwell time of 40 minutes in a fluidized bed crystallizer in the presence of nitrogen at a gas temperature of 190° C., and then crystallized in the presence of nitrogen in a stirred crystallizer while heating to 212° C. with a dwell time of 70 minutes and next cooled to 208° C. for a period of 2 minutes. Then the solid-state polycondensation was performed at an average temperature of 208° C. in the presence of nitrogen. There were no fluctuations in level of the chips or problems in discharge from the solid-state polycondensation reactor. Measurement of TE (1 μm) yielded a temperature of 207° C. and $T_u$ was 213° C.

I claim:

1. Process for thermal solid-state treatment of linear polyester chips in the presence of inert gas which comprises crystallizing said chips followed immediately by thermal treatment in a static bed at a chip temperature equal to TE (1 μm) ±2° C., said chip temperature (TE (1 μm) being measured by thermomechanical analysis by placing a measurement probe having a hemispherical head with a diameter of 3 mm and a load of 0.5 N on a crystallized chip, heating said chip at a rate of 5° C./min. and determining the temperature of said chip when the probe has descended by 1 μm.

2. Process of claim 1 in which TE (1/μm) is equal to the average of at least 5 measurements.

3. Process of claim 1 in which said crystallizing step is carried out continuously in a fluidized bed in the presence of inert gas and comprises a) heating said chips in said fluidized bed in the presence of previously crystallized chips, at a temperature of 140°–220° C. and an average residence time of 15–150 minutes, b) continuing said crystallization at a higher chip temperature in the range between 170° C. to 5° C. below the crystallite melting point of said polyester and 1° to 40° C. above the temperature TE (1 μm) and an average residence time of 30–200 minutes, and c) reducing the temperature to the temperature TE (1 μm) over a period of 1 to 50 minutes.

4. Process of claim 3 in which the temperature in step b) is 3° to 20° C. above the temperature TE (1 μm).

5. Process of claim 1 in which said thermal treatment consists of solid state polycondensation and/or dealdehydization and/or drying.

6. Process of claim 1 in which said polyester is the reaction product of a) a dicarboxylic acid taken from the group consisting of terephthalic acid, isophthalic acid, 2,6-naphthalenedicarboxylic acid, 4,4-biphenyl dicarboxylic acid 1,4-cyclohexanedicarboxylic acid or mixtures thereof, and b) a diol taken from the group consisting of ethylene glycol, 1,3-propanediol, 1,4-butanediol, 1,4-cyclohexanedimethanol, diethylene glycol or mixtures thereof.

7. Process of claim 6 in which said polyester is an ethylene terephthalate copolymer with a total of 0.8 to 10 wt %, based on the copolymer, of units of comonomer taken from the group consisting of diethylene glycol, 1,4 cyclohexanedimethanol, isophthalic acid, or mixtures of at least two of these comonomers.

8. Process of claim 1 or 3 in which said inert gas is taken from the group consisting of dry air, nitrogen, noble gases, carbon dioxide, or mixtures of at least two of these gases.

* * * * *